(12) United States Patent
Gold

(10) Patent No.: US 7,281,159 B2
(45) Date of Patent: *Oct. 9, 2007

(54) MANAGING DISK DRIVE REPLACEMENTS ON MULTIDISK HEADLESS APPLIANCES

(75) Inventor: Stephen Gold, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/025,937

(22) Filed: Jan. 3, 2005

(65) Prior Publication Data

US 2005/0166090 A1   Jul. 28, 2005

Related U.S. Application Data

(63) Continuation of application No. 09/843,144, filed on Apr. 27, 2001, now Pat. No. 6,845,466.

(30) Foreign Application Priority Data

Oct. 26, 2000  (GB) .................................. 0026197.4

(51) Int. Cl.
*G06F 11/00* (2006.01)

(52) U.S. Cl. .................................. 714/7; 714/6; 714/5

(58) Field of Classification Search ................... 726/34
See application file for complete search history.

(56) References Cited

U.S. PATENT DOCUMENTS

| | | | |
|---|---|---|---|
| 5,325,497 A | 6/1994 | Jaffe et al. | |
| 5,469,573 A | 11/1995 | McGill, III et al. | |
| 5,751,936 A | 5/1998 | Larson et al. | |
| 5,752,257 A | 5/1998 | Ripoli et al. | |
| 6,266,740 B1 | 7/2001 | Don et al. | |
| 6,281,894 B1 | 8/2001 | Rive | |
| 6,351,850 B1 | 2/2002 | van Gilluwe et al. | |
| 6,425,049 B1 | 7/2002 | Yamamoto et al. | |
| 6,446,199 B1 | 9/2002 | Howe et al. | |
| 6,487,623 B1 | 11/2002 | Emerson et al. | |
| 6,553,387 B1 | 4/2003 | Cabrera et al. | |
| 6,598,174 B1 | 7/2003 | Parks et al. | |
| 6,662,318 B1 | 12/2003 | Baysah et al. | |
| 6,665,771 B1 | 12/2003 | Michel et al. | |

(Continued)

FOREIGN PATENT DOCUMENTS

EP   0541996 A2   5/1993

(Continued)

*Primary Examiner*—Marc Duncan

(57) ABSTRACT

A headless computer entity having a plurality of disk drives self-restores to a known state upon failure of either a system disk drive containing an operating system of the computer entity or failure of a data disk drive containing application data. Depending upon whether the system disk and/or data disk are replaced by a replacement disk, the computer entity configures itself with either deletion of application data on the data disk or deletion of application data on both the system and data disks. The computer entity determines whether a new replacement disk has been installed by comparing a signature of the system disk with a signature of the data disk. If a replacement disk is detected, the computer entity sets the digital signatures such that the system and data disks have a self-consistent set of hardware-specific digital signatures. Application data is returned to a known good state after deletion.

12 Claims, 17 Drawing Sheets

U.S. PATENT DOCUMENTS 6,665,786 B2  12/2003  McMichael et al.
6,681,323 B1  1/2004  Fontanesi et al.
6,845,466 B2 * 1/2005  Gold .......................... 714/7

FOREIGN PATENT DOCUMENTS

EP  0696773 A1  2/1996
GB  2344441 A   6/2000

* cited by examiner

| System Reset: Restore user settings | System Reset: Manual Initiation | System Reset: Data Deleted | Alert |
|---|---|---|---|
| SET | | | System was automatically repaired after operating system failure, without any loss of backup data |
| SET | SET | | System repair/update was manually initiated, without any loss of backup data |
| SET | | SET | System automatically repaired after a data disk replacement, but backup data could not be recovered and so was deleted |
| SET | SET | SET | System repair/update manually initiated, but backup data has been deleted |

Fig. 12

MANAGING DISK DRIVE REPLACEMENTS ON MULTIDISK HEADLESS APPLIANCES

CROSS-REFERENCE TO RELATED APPLICATIONS

This is a continuation of, and claims the benefit of priority under 35 U.S.C. §120 based on, U.S. application Ser. No. 09/843,144, filed Apr. 27, 2001 now U.S. Pat. No. 6,845,466, and also claims the benefit of priority under 35 U.S.C. §119 of British Application No. 0026197.4, filed Oct. 26, 2000, the entire disclosures of which are hereby herein incorporated by reference.

FIELD OF THE INVENTION

The present invention relates to the field of computers, and particularly although not exclusively, to a method of managing data-storage device replacements on a computer entity having a plurality of data storage devices.

BACKGROUND TO THE INVENTION

A conventional computer entity typically comprises a casing containing a processor, memory, input\output ports, a data storage device, e.g. a hard disk drive or the like, a user interface comprising a video monitor, a keyboard, and a tactile device e.g. a mouse or trackball, for driving a graphical user interface. Such computer entities are well known in the prior art.

One known type of computer entity, is known as a "headless" computer entity (also called a "headless appliance"). Known headless computer entities comprise a processor, one or more data storage devices, input\output ports, and memory, but lack the usual physical console user interface, that is they are not provided with a user console having a visual display monitor, mouse or keyboard. Headless computer entities are not generally intended to be used under direct human control or intervention. A known network attached storage device (NAS) is an example of a known headless computer entity.

Headless computer entities have an advantage of relatively lower cost due to the absence of a user console, and associated hardware for that console. However, because headless computer entities do not have conventional user interfaces for human interaction, and generally do not have ports by which conventional keyboards or video monitors can be connected, this creates specific problems if there should be a disk failure of a headless computer entity in the field, that is, after manufacture and once the computer entity has been commissioned in it's own operating environment.

Failures of headless computer entities in the field may give rise to a manufacturer service callout. A service engineer or a technician has a difficult task in repairing a headless computer entity compared with a conventional headed computer entity having a user interface as s\he cannot install software through Wizards or other operator-interactive installation procedures, because there is no physical, visual or tactile user interface console provided with the headless computer entity.

In a headless computer entity having twin hard disk drives, if a disk drive fails, then data may be lost. In a headless computer entity having multiple disks, there needs to be some sort of scheme to handle disk failure and replacement without the need for human intervention, other than physical replacement of a physical component.

SUMMARY OF THE INVENTION

According to a first aspect of the present invention there is provided a method of operating a computer entity comprising a plurality of data storage devices, to install at least one said data storage device, said method comprising the steps of:

checking a first said data storage device for a digital signature;

checking a second said data storage device for a digital signature;

determining whether said first and second digital signatures match each other; and if a discrepancy in signatures is found between said first and second data storage devices, setting digital signatures of said first and second data storage devices to be in a self consistent set.

According to a second aspect of the present invention there is provided a data storage device comprising:

a data storage medium, said data storage medium preconfigured for storage of code data comprising:

a primary operating system;

a secondary operating system;

a copy of said primary operating system; and an installation component for automatically installing said data storage device into a computer entity.

According to a third aspect of the present invention there is provided a method of operating a computer entity comprising a plurality of data storage devices, wherein:

a first said data storage device is designated as a system data storage device, which stores operating system files;

a second said data storage device is designated as a bulk data storage device, for storing application data generated by one or more applications of a said computer entity;

said method comprising the steps of:

checking each of said plurality of data storage devices to see if said data storage device has been replaced following a last reset operation of said computer entity; and if a said data storage device is detected, which has been replaced since a last reset operation of said computer entity, then resetting said computer entity to a known state.

According to a fourth aspect of the present invention there is provided an installation procedure for installing a data storage device into a computer entity configured to contain a plurality of data storage devices, said installation procedure comprising the steps of:

introducing into said computer entity a digital storage device loaded with at least one operating system, and an installation component for installing said data storage device into said computer entity;

checking each said data storage device of said computer entity for a signature;

determining whether all said signatures of said data storage devices are in a matching set;

if said plurality of signatures are determined not to be in a matching set, then determining which data storage devices are already designated as system data storage devices, containing an operating system and which data storage devices are already designated as for storing bulk data;

depending on the result of step (iv), designating said introduced data storage device as a system data storage device or a bulk data data storage device, so that within said plurality of data storage devices there exists at least one system data storage device and at least one bulk data storage device; and resetting said computer entity to a known state.

In specific implementations according to the present invention a disk signature process is used to determine whether a disk (either a hard disk or a RAID disk) in a multidisk computer entity has been replaced. Setting of application data back to a manufacturing default state, including resetting databases, without loss of generic computer entity settings, such as network settings, security settings, date, time and the like is provided automatically.

The option to do a reset of a computer entity with user data deletion is provided in specific implementations of the present invention.

The computer entity comprises a plurality of data storage devices, for example hard disk drives, a communications port, and at least one data processor, wherein a primary operating system, a secondary emergency operating system, and a pristine uncorrupted copy of the primary operating system are stored on at least one of the data storage devices. The computer entity also stores one or a plurality of applications programs, which in use generate application data. The data storage devices are partitioned, and designated as a system disk, which stores code of the operating systems, and at least one data disk, which stores data, for example data generated by a plurality of applications programs.

In one specific embodiment, a computer entity has a plurality of disks, one disk being assigned as a system disk and another disk being assigned as a data disk. Each time a primary operating system of the computer appliance is booted, it is checked whether the individual signatures of each disk match each other, or are blank. Depending upon the results of the signature check, various outcomes are possible:

If there is no signature on a data disk, and no signature on a system disk, then this indicates that both disks may be newly installed. In this case, the computer entity checks whether a partition structure on the new data disk matches an expected partition structure. If the partition structure on the new data disk does not match the expected partition structure, then the new data disk is automatically erased, and a correct partitioning is applied to the data disk. Once the correct partitioning structure has been applied to the data disk, then a unique disk signature is generated and written to both the system disk and the data disk. If a data disk contains a disk signature, but a system disk has no signature, then this indicates that the system disk has been replaced. In this case, the computer entity automatically deletes all files present in a secondary data partition on the data disk, and creates new disk signatures which are applied to both the data disk and the system disk, so that the new system disk and the old data disk are marked by the signatures to be in a coherent set of disks.

If the system disk contains a disk signature, but the data disk has no signature, or if both disks have signatures, but the signatures do not match, then this means that the data disk has been replaced, or disks from two different computer entities have been mixed on a single computer entity. In both cases, the application data on the computer entity may be corrupted, since it spans across both disks. Under these circumstances there is automatically performed a rebuild of a primary operating system of the computer entity, with all application data deleted. This returns the application data on both the system disk and the data disk to a factory default condition.

Specific implementations of the present invention may have advantages as follows:

If either a system disk or a data disk or both a system disk and a data disk in a computer entity are replaced in an operational computer entity in its operating environment, after a disk failure, then the computer entity automatically synchronizes both disks, including replacement disks, to ensure that application data is consistent across both the system disk and the data disk, by resetting the application data to a factory default state.

During manufacturing of a computer entity, there is no need to have specific system disks and data disks which are different from each other, or which are specific to different slots in the computer entity. Instead, every disk in manufacturing is identical, and contains an image of a master system disk. A manufacturing process is used to install both of these identical disks into a computer entity, and then a computer entity boot automatically initializes one of the disks to be a data disk. This means that there is no risk of getting a wrong disk type into a wrong slot during manufacture.

There is no need to stock separate system and data disks for field replacement. A single generic system disk is used to replace either a failed system disk or a failed data disk in a computer entity in the field. If the stock generic system disk is used to replace a data disk, then the computer entity automatically converts the stock generic system disk into a data disk in situ in the computer entity in the field.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 12 illustrates schematically a set of status flags, which are set or reset within the computer entity, for determining a recovery mode of the computer entity;

DETAILED DESCRIPTION OF THE PREFERRED EMBODIMENTS

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification there is referred to a data storage device. It will be understood by a person skilled in the art that a data storage device need not be a hard disk device, but may be any type of data storage device having read and write access, and the invention is not limited to implementations including hard disks, but rather, any data storage device having read and overwrite capability may be used as replacement for a hard disk. In the specification, by the term "disk" it is meant a data storage device which is a self contained replaceable manufactured unit capable of storing digital data, for example in magnetic, electronic or optical format. Disks may include well known magnetic rotating hard disk drive units, magnetic random access memory devices, rewriteable optical data storage devices or the like.

The terms disk and hard disk shall be construed accordingly in this specification as being an example of a data storage device.

Figure 1:
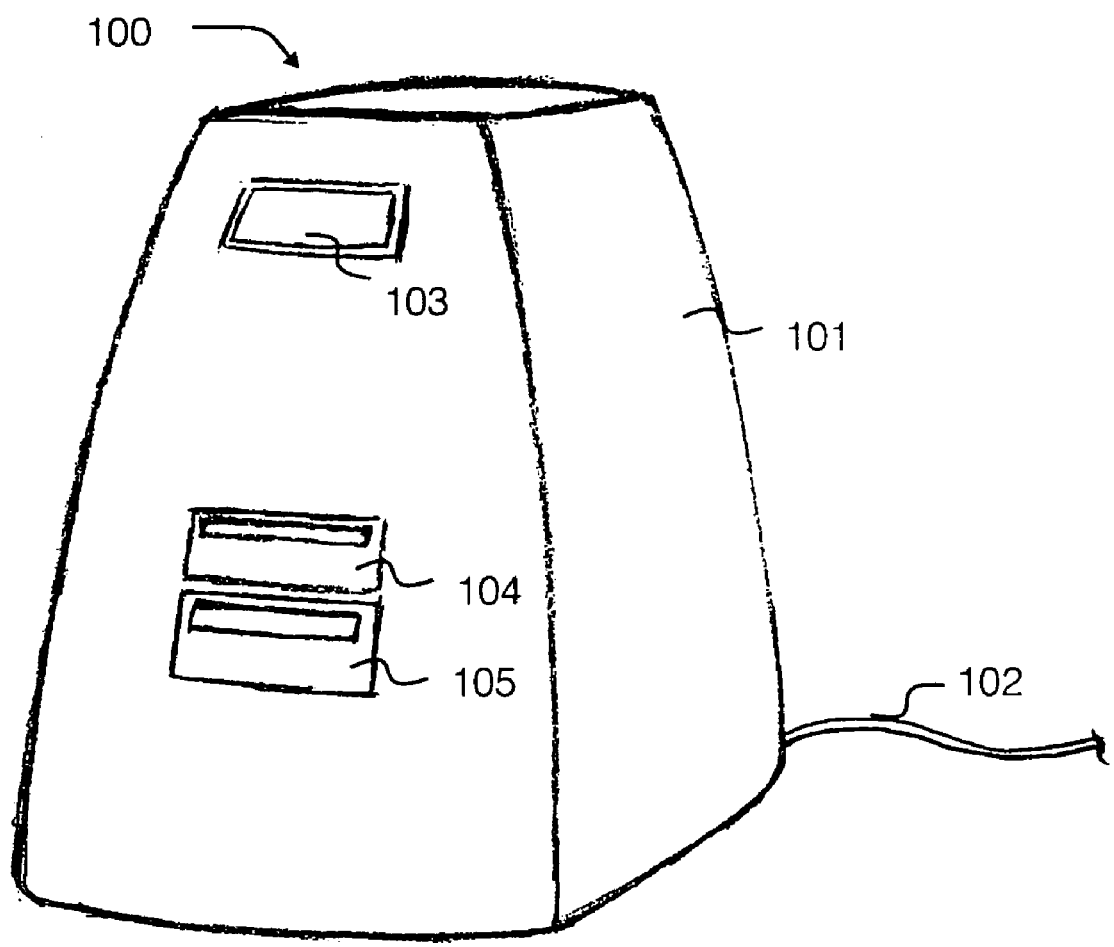
FIG. 1 illustrates schematically in perspective view a headless computer entity.

Referring to FIG. 1 herein there is illustrated in perspective view, a headless computer entity 100. The headless computer entity comprises a casing 101, containing a processor, a memory, at least one data storage device e.g. a plurality of hard disks, or a RAID array of disks, or a disk mirror arrangement; a communications port connectable to a local area network cable 102; a small display, for example a liquid crystal display (LCD) 103 giving limited information on a status of the device, for example POWER ON, STANDBY or other modes of operation; optionally, a CD ROM drive 104, and optionally a back-up tape data storage device 105. Otherwise the headless computer entity has no physical console user interface, and is self-maintaining when in operation. Direct human intervention with the headless computer entity is restricted by the lack of a physical console user interface. In operation, the headless computer entity is intended to be self-managing and self-maintaining.

In this detailed description, there is described a computer entity embodiment having a plurality of hard disk data storage devices, where one hard disk is configured as a system disk for storing operating system files and application files, and another hard disk is configured as a data disk for storing application data generated by applications.

Figure 2:
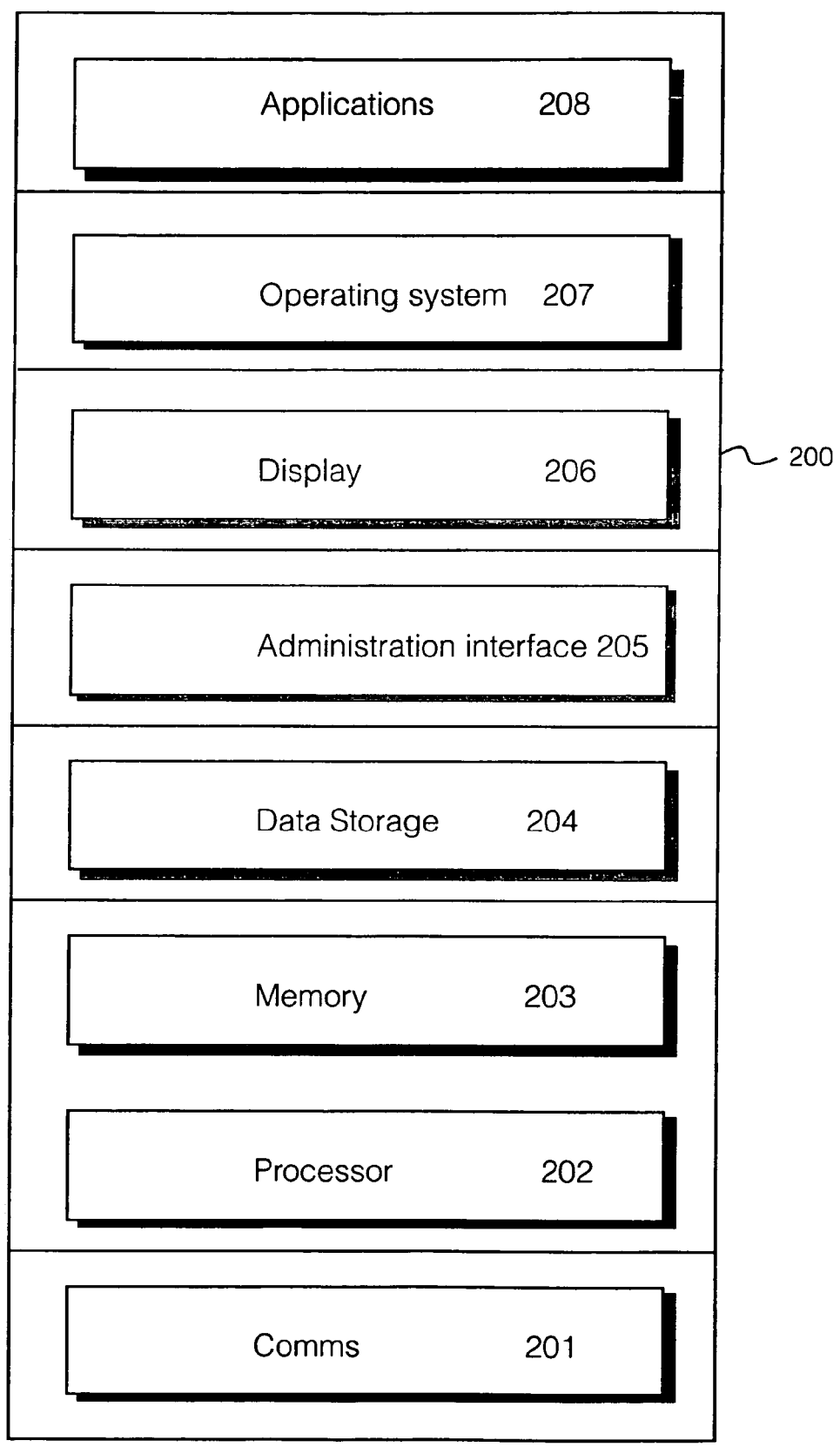
FIG. 2 illustrates schematically a hardware and firmware content of the headless computer entity of FIG. 1.

Referring to FIG. 2 herein, there is illustrated schematically an architecture of hardware and firmware components of the headless computer entity 200. The computer entity 200 comprises one or more communications ports 201; one or more data processing devices 202 as are known in the art; a memory 203 associated with the data processor(s); at least one data storage device 204, for example a hard disk data storage device, or an array of a plurality of hard disk data storage devices; an administration interface 205 comprising a web page display; a small display mounted on the casing, e.g. a liquid crystal display device 206; a plurality of operating systems 207 as will be described herein after; and one or a plurality of application programs 208 providing functionality to the headless computer entity.

Figure 3:
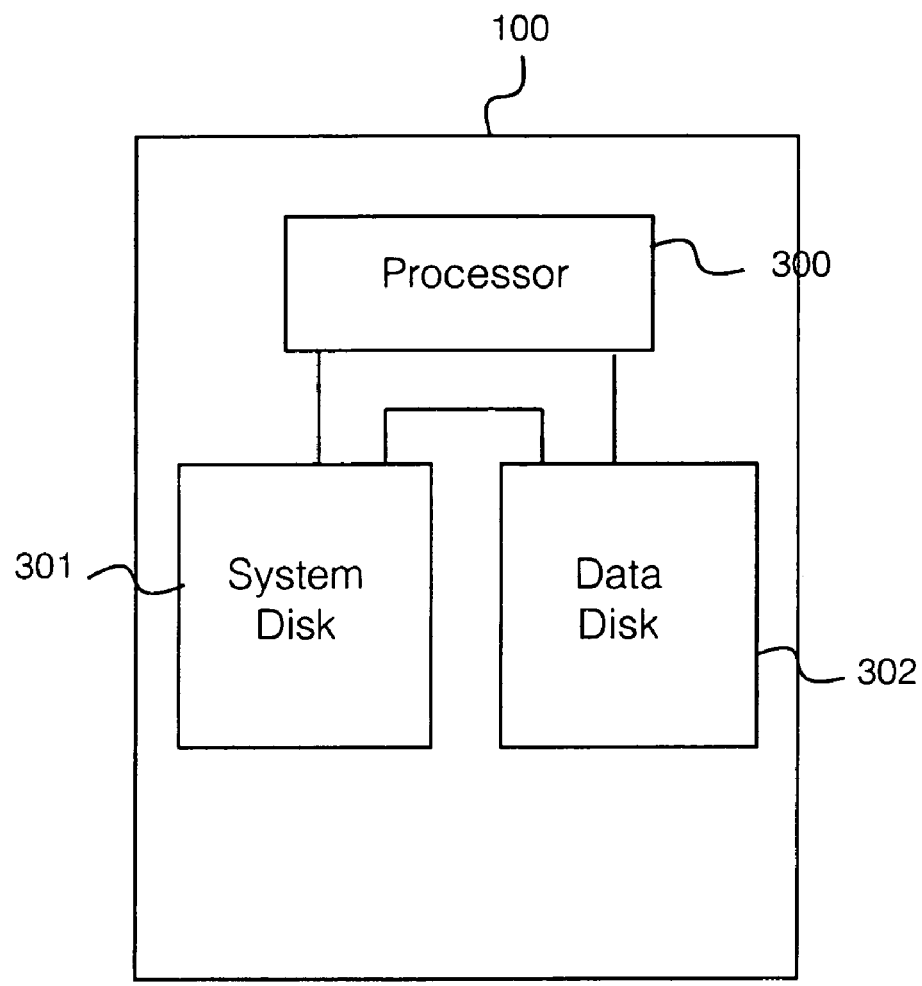
FIG. 3 illustrates schematically an arrangement of a plurality of disk data storage devices in the headless computer entity of FIG. 1.

Referring to FIG. 3 herein, there is illustrated schematically a hardware configuration of computer entity 100. Data storage devices 204 comprise a system disk 301, and a data disk 302.

The system disk contains a primary operating system, an emergency operating system, a copy of files of the primary operating system and copies of default data of the primary operating system. The data disk comprises a large partition area for storage of binary data as binary large objects (BLOBS).

Figure 4:
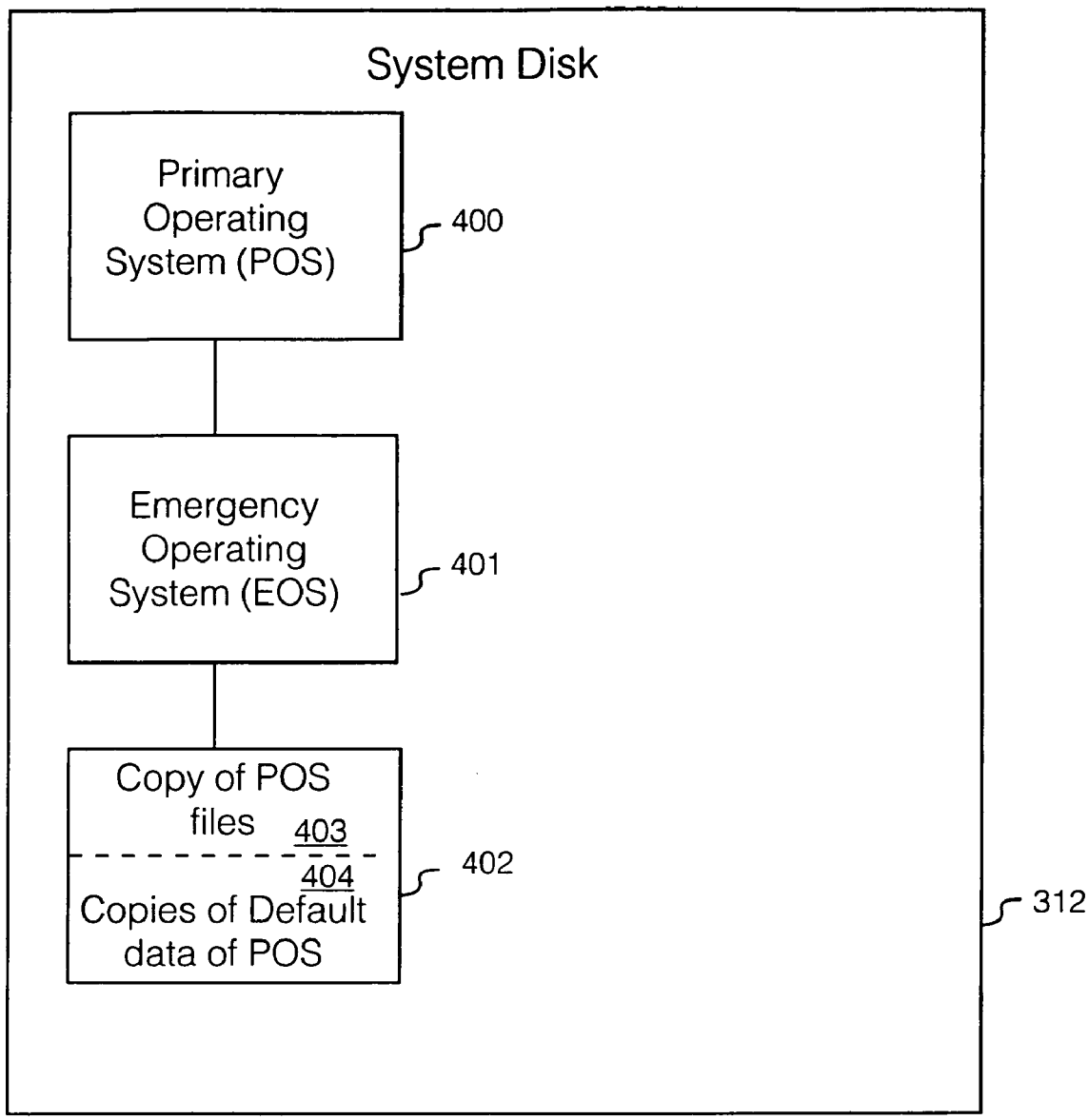
FIG. 4 illustrates schematically a plurality of operating systems stored on a system disk of the computer entity of FIG. 1.

Referring to FIG. 4 herein there is illustrated schematically operating system components stored on the system disk 301 of the computer entity 100. The operating system components comprise a primary operating system 400, which operates to control the computer entity under normal running conditions; a secondary emergency operating system 401, which serves to take control of the computer entity under conditions of primary operating system repair or installation; and a pristine back-up copy of the operating system 402, which is maintained in an uncorrupted state and which is not used operationally to run the computer entity, but is used in order to restore or replace the primary operating system 401 in the event of failure. The back-up copy primary operating system comprises a set of primary operating system files 403, and copies of default set up data 404 of the primary operating system.

Figure 5:
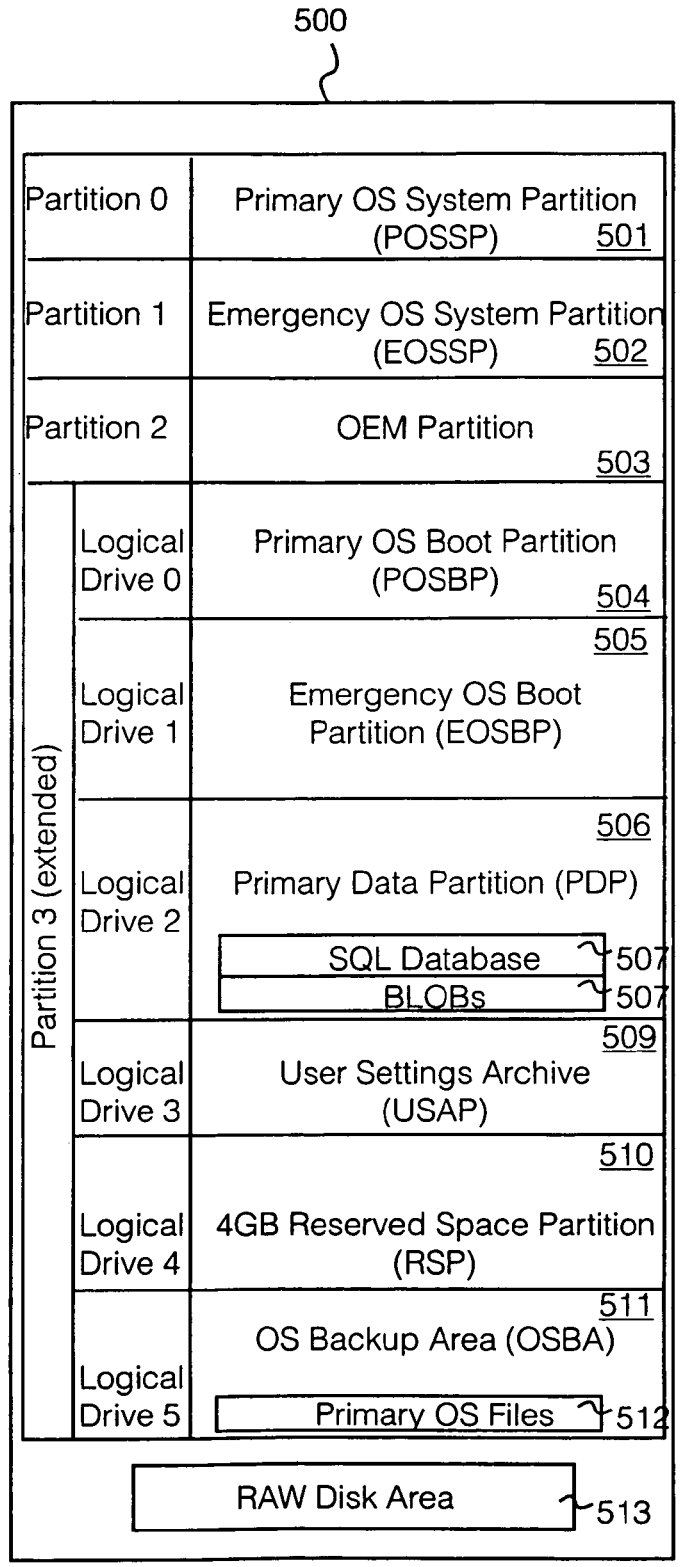
FIG. 5 illustrates schematically a partitioning of a system disk of the computer entity of FIG. 1.

Referring to FIG. 5 herein, there is illustrated schematically a format of a system disk 204, upon which operating systems 207 are stored. The system disk is partitioned into a logical data storage area 500 which is divided into a plurality of partitioned areas according to the architecture shown. A plurality of partitions include a primary operating system system partition 501 (POSSP), which contains key operating system files for initiating boot of the primary operating system; an emergency operating system partition 502 (EOSSP) containing key operating system files used to boot the emergency operating system of the computer entity; an OEM partition 503; a primary operating system boot partition 504 (POSBP), from which the primary operating system continues to be booted or rebooted; an emergency operating system boot partition 505 (EOSBP), from which the emergency operating system is booted, the primary operating system system partition and emergency operating system system partition being small "boot strap" system partition which are used to start the operating system boot process and then hand over the rest of the operating system boot process to the primary operating system boot partition 501 for boot of the primary operating system, or to the emergency operating system boot partition 502 for boot of the emergency operating system; a primary data partition 506 (PDP) containing an SQL data base 507, and a plurality of binary large objects 508, (BLOBs); a user settings archive partition 509 (USAP); a reserved space partition 510 (RSP) typically having a capacity of the order of 4 gigabytes or more; and an operating system back up area 511 (OSBA) containing a back up copy of the primary operating system files 512; and a raw disk partition area 513.

A first disk signature identifying the system disk is stored in the raw disk area 513 of system disk, outside of the remaining partition areas, so that processes which erase and re-create those disk partition areas do not affect the system disk signature.

Figure 6:
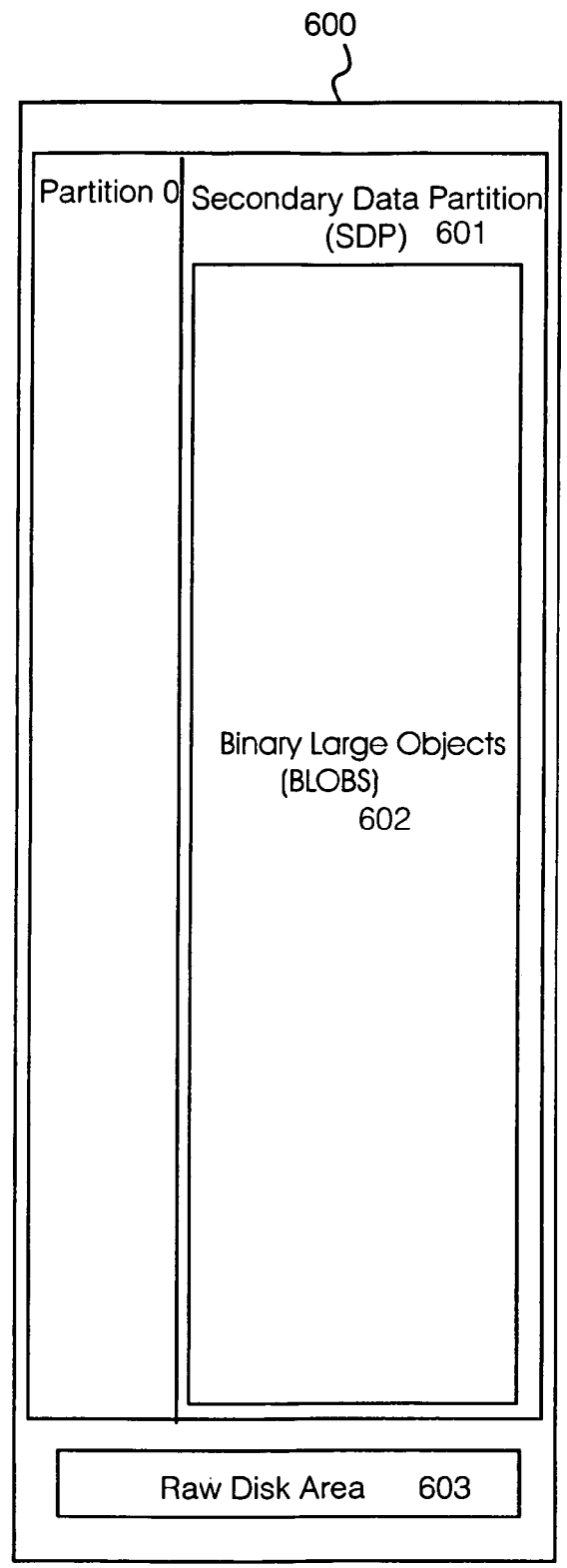
FIG. 6 illustrates schematically a partitioning of a data disk of the computer entity of FIG. 1.

Referring to FIG. 6 herein, there is illustrated schematically a format of the data disk 302. The data disk 302 comprises a second logical data storage area 600 partitioned into a secondary data partitioned 601 suitable for storing a plurality of binary large objects (BLOBS) 602, and a raw disk area 603.

A second disk signature identifying the data disk is stored in the raw disk area 603, outside of the secondary data partition 601, so the processes which erase and re-create the secondary data partition 601 do not affect the data disk signature.

The components shown in FIG. 5, are contained on each disk component, either in the factory during manufacture of the computer entity, or as a replacement disk component for installation in the field.

A field replacement of a disk drive comprises physically removing a disk from a slot in a hardware chassis of the computer entity, and inserting a replacement disk drive, which contains a master system disk template, the master system disk template comprising the partitions as shown in FIG. 5, and additionally within the primary operating system, an installation component which installs the replacement disk within the computer entity. Since the replacement disk has no knowledge of whether a failed disk in the computer entity was a system disk or a data disk, the installation component is capable of configuring the replacement disk into either a system disk, or a data disk. In the case of reconfiguration into a system disk, the installation component retains the primary operating system, secondary emergency operating system, and all the partitions and data content illustrated in FIG. 5. In the case of configuration into a data disk, the replacement disk re-partitions itself into one large secondary partition as illustrated with reference to FIG. 6.

In the headless computer entity having a plurality of disks, where one disk is designated as a system disk, for storing system data, including an operating system, and configuration settings, and another disk is configured as a data disk, for storing data, for example in the form of binary large objects (blobs), application data may be spread across both disks.

If one of the disks fails, then any replacement procedure for replacing a disk with a new disk needs to "tidy-up" the remaining correctly operating disk so that after replacement of the faulty disk, application data is synchronized with the remaining original non-faulty disk. Since the computer entity has no console, this cannot be done manually by an administrator. In the specific implementations of the present invention, when a hard disk replacement has been detected, the computer entity automatically tidies up the working non-faulty and synchronizes the new replacement disk with the existing non-faulty disk.

Figure 7:
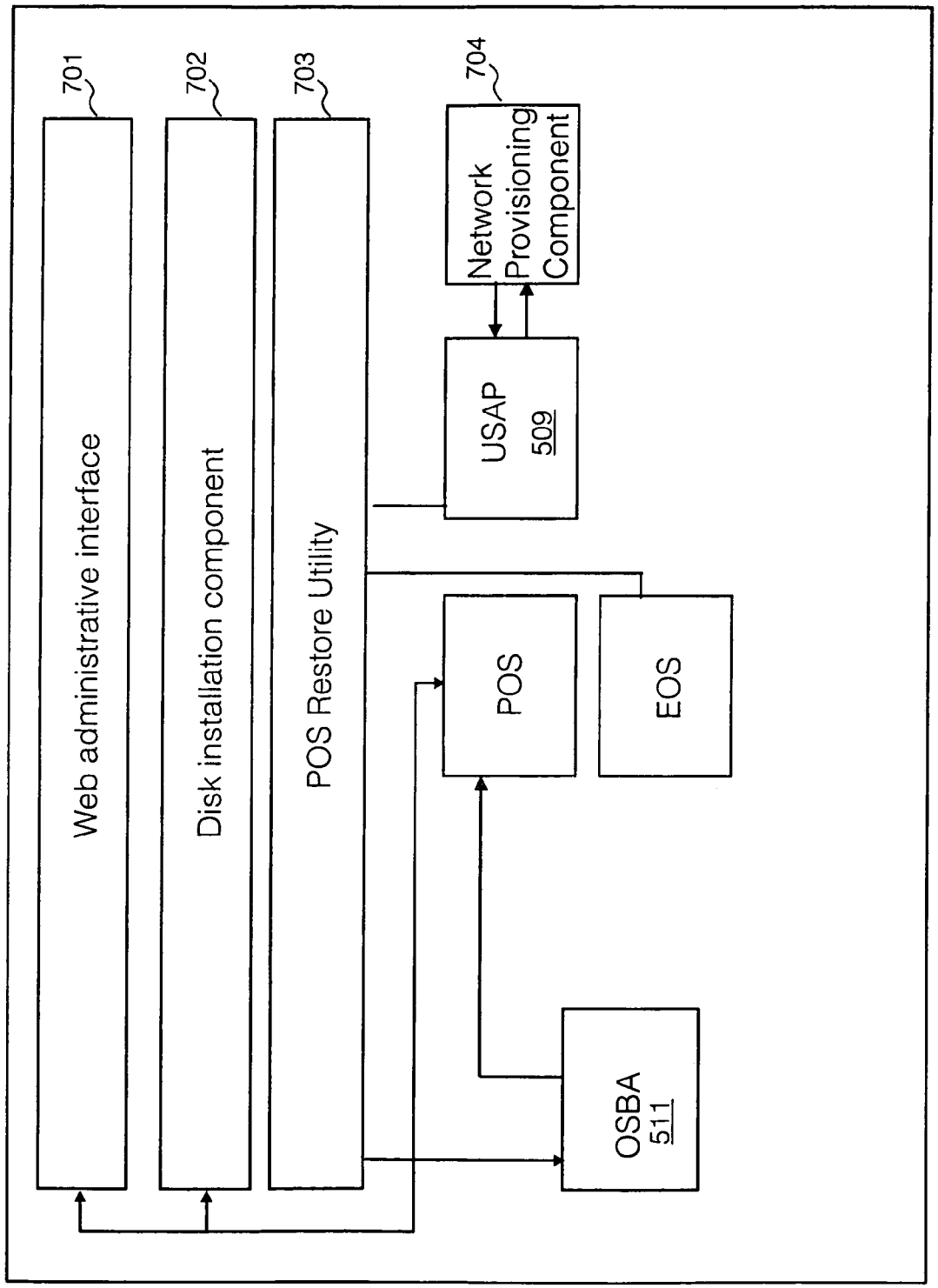
FIG. 7 illustrates schematically application and operating system components used for carrying out an installation procedure for a disk component.

Referring to FIG. 7 herein, there is illustrated schematically application and operating system components involving an interaction between a plurality of applications 208 and the operating system 207 for replacement of a disk device in the computer entity, and implementing automatic installation of the disk device. The applications comprise a web administration interface 701 for presenting displays accessible by a web browser on a remote computer entity, for checking the progress of an installation procedure; a disk installation component 702 for managing installation of a hardware component in terms of reconfiguration of a hardware component, the disk installation component 702 running every time the primary operating system boots, the disk installation system controlling reconfiguration of the system to install replacement disk hardware; a primary operating system restore utility 703 capable of rebooting the computer entity, and a network provisioning component 704 for making or restoring network connections.

Figure 8:
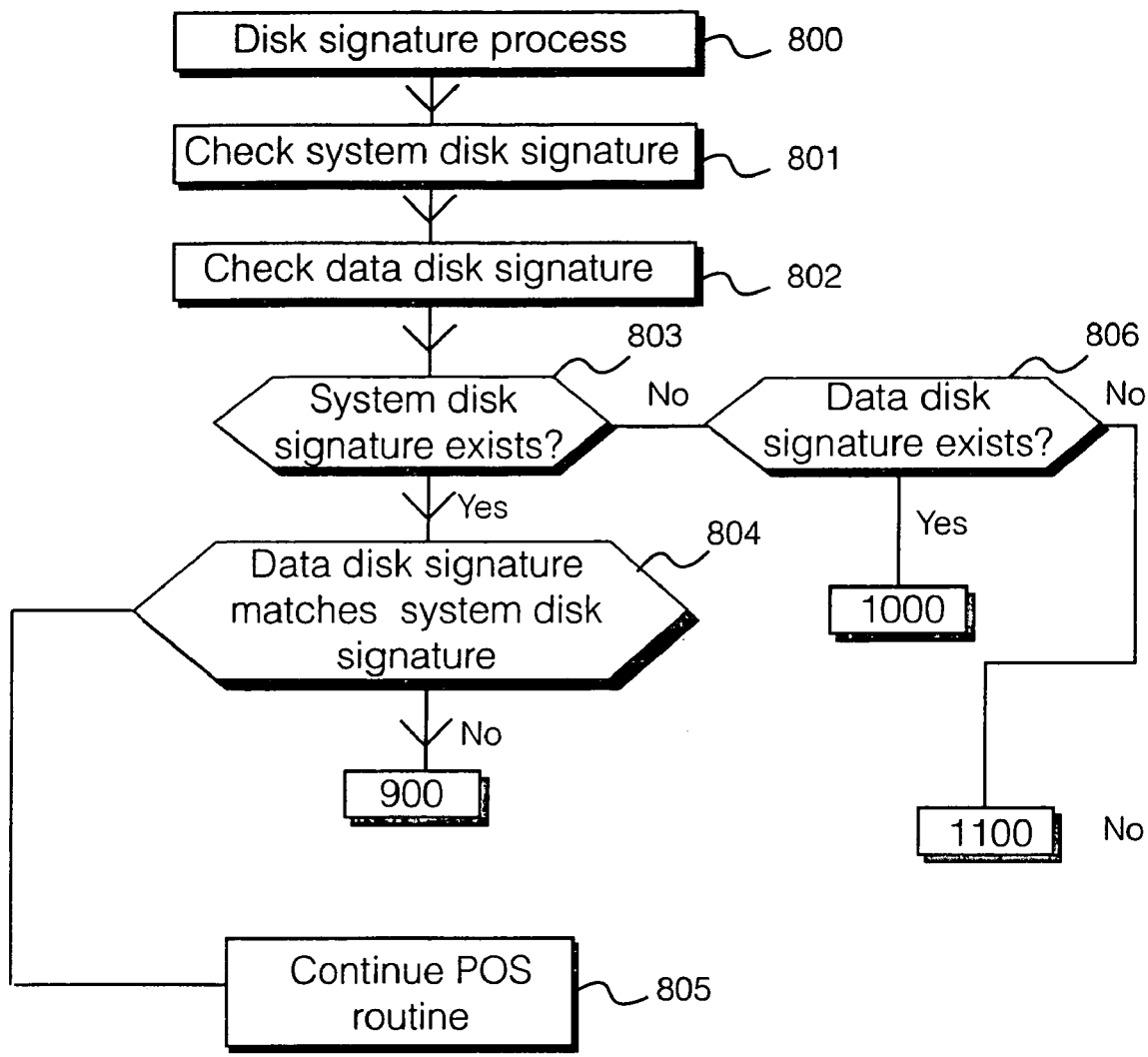
FIG. 8 illustrates schematically a process carried out by the computer entity for checking a digital signature on a system disk and a data disk.

Referring to FIG. 8 herein, there is illustrated schematically a disk signature process which is carried out every time the primary operating system in the computer entity boots. Each disk carries a unique disk signature based upon an MAC address of the computer entity. In step 801, the primary operating system checks the system disk for a digital signature. In step 802, the primary operating system checks the data disk for a disk signature. In step 803, if a system disk signature does exist, then in step 804, it is checked whether the data disk signature matches the system disk signature. If both the data disk signature and the system disk signature match each other and form part of a self consistent set, then this indicates that the system disk and data disk are the same ones as previously installed and no hardware changes have occurred. Therefore the primary operating system continues to its next operation in step 805, and exits the disk hardware checking routine. However, if in step 804 the data disk signature is found not to match the system disk signature, for example because the data disk has a signature, but that signature is not consistent with the system disk signature, or the data disk has no signature, then this indicates that the data disk has been replaced, or a human user has mixed disks from two different computer entities. In both these cases, back up data on the computer entity is corrupted, so the computer entity is rebooted and reset, with data deletion following process 900 as is described hereinafter.

If in step 803, a system disk signature does not exist, and in step 806 if a data signature does exist, then this indicates that the system disk has been replaced. In this case, the computer entity automatically deletes all files present in the secondary data partition 601 on the data disk and creates brand new disk signatures on both the data disk and the system disk so that the new system disk and the old data disk form a coherent matched set. In the best mode implementation all existing disk partitions are erased from the data disk, and are then re-created. A secondary data partition is reformatted on the data disk, since this is faster than deleting all the files, and results in a "clean" blank secondary data partition. Additionally, if there are application data base files on the secondary data disk, then there may be copied any default secondary data partition data base files from the operating system back up area 511. This process is described with reference to FIG. 10 hereafter.

If in step 803, a system disk signature is found not to exist, and if in step 806 a data disk signature is found not to exist, then this indicates that both disks are newly installed. Under these circumstances the computer entity follows a routine as described herein with reference to FIG. 11, in which a new signature is created and applied to both disks.

Figure 9:
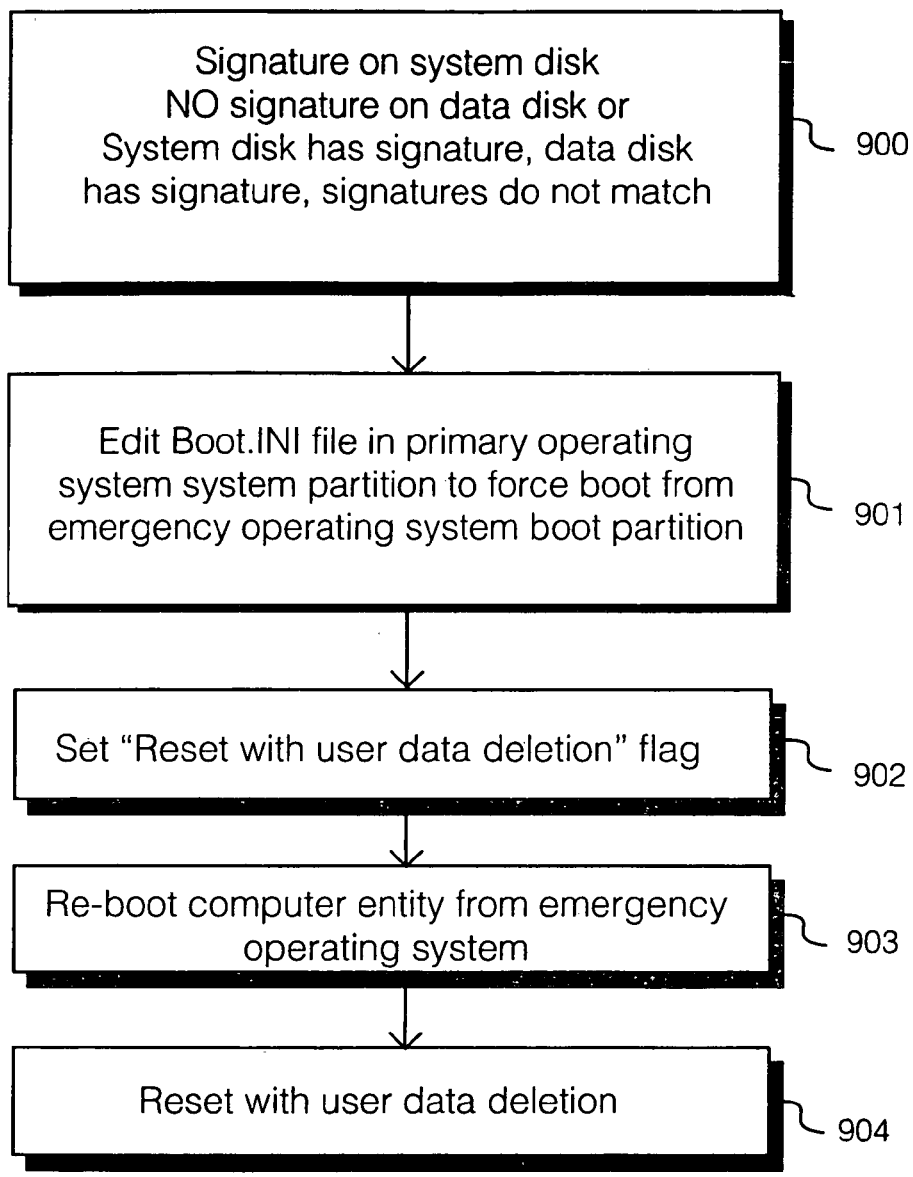
FIG. 9 illustrates schematically a process carried out by the computer entity where a system disk having a signature is detected, and a data disk having no signature is detected, or a system disk having a signature and a data disk having a signature are detected, but the signatures on the system disk and data disk do not match.

Referring to FIG. 9 herein, there is illustrated a process followed by the computer entity where a system disk contains a disk signature, but a data disk has no signature, or if both the system disk and data disk have signatures, but the signatures do not match each other. This indicates that the data disk has been replaced or the user has mixed different disks from two different computer entities. In both cases, in step 901, a boot file BOOT.INI in the primary operating system system partition 501 is edited in order to force a boot from the emergency operating system boot partition 505. In step 902, a flag is set so that during a reset operation of the computer entity, data deletion from the data disk is carried out. In step 903, a reboot of the computer entity from the emergency operating system is carried out, and in step 904 a reset operation involving deletion of user data on the data disk is carried out. A reset with user data deletion operation is described hereinafter. The reset with data deletion procedure is performed automatically without user intervention.

Figure 10:
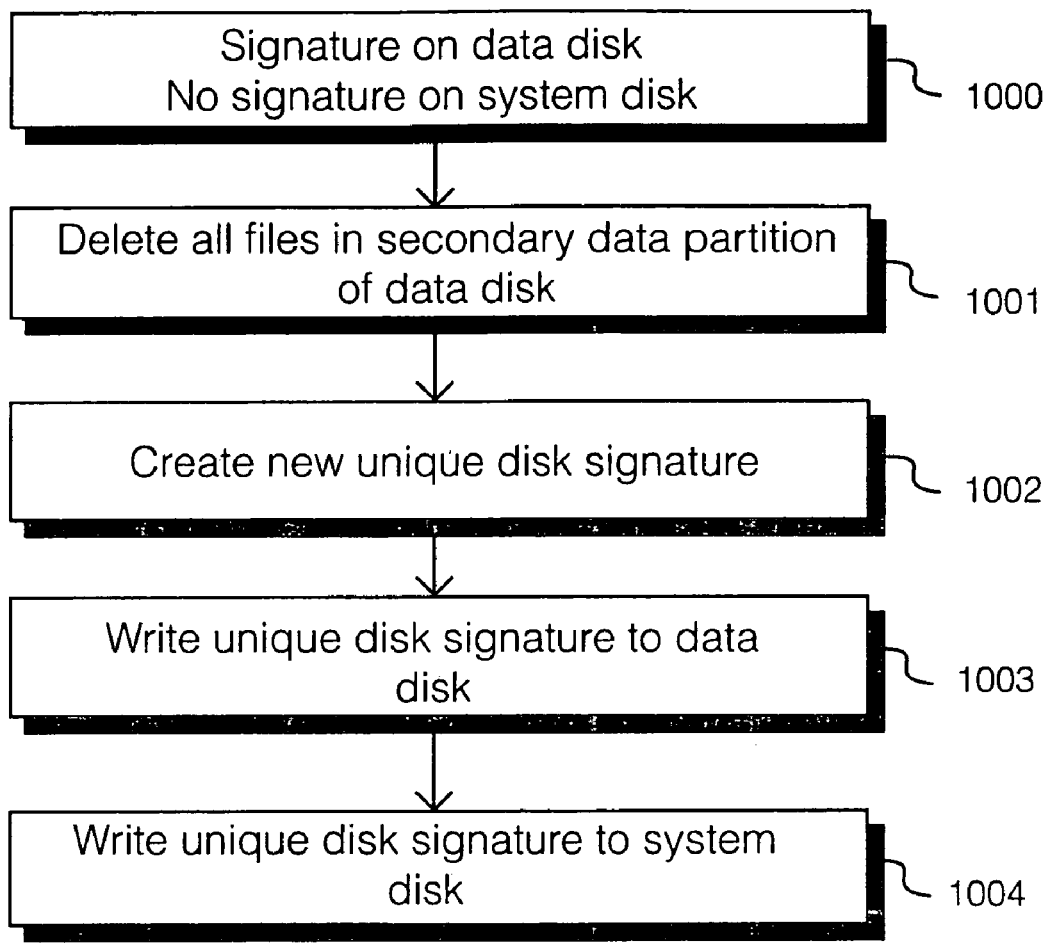
FIG. 10 illustrates schematically a process carried out by the computer entity where a signature on a data disk is detected, but a system disk having no signature is detected.

Referring to FIG. 10 herein, there is illustrated schematically a process 1000 carried out by the computer entity where a signature is found on the data disk, but no signature is found on the system disk. In step 1001, all files in the secondary data partition of the data disk are deleted automatically. In the best mode implementation all existing disk partitions are erased from the data disk, and are then re-created. A secondary data partition is reformatted on the data disk, since this is faster than deleting all the files, and results in a "clean" blank secondary data partition. Additionally, if there are application data base files on the secondary data disk, then there may be copied any default secondary data partition data base files from the operating system back up area 511. In step 1002, a new unique signature is created by disk installation component 702, which is written to the data disk in step 1003 and to the system disk in step 1004. At this stage, there is known default data on the system disk, since the system disk is new, and the default data partition on the data disk has been erased and re-created.

Figure 11:
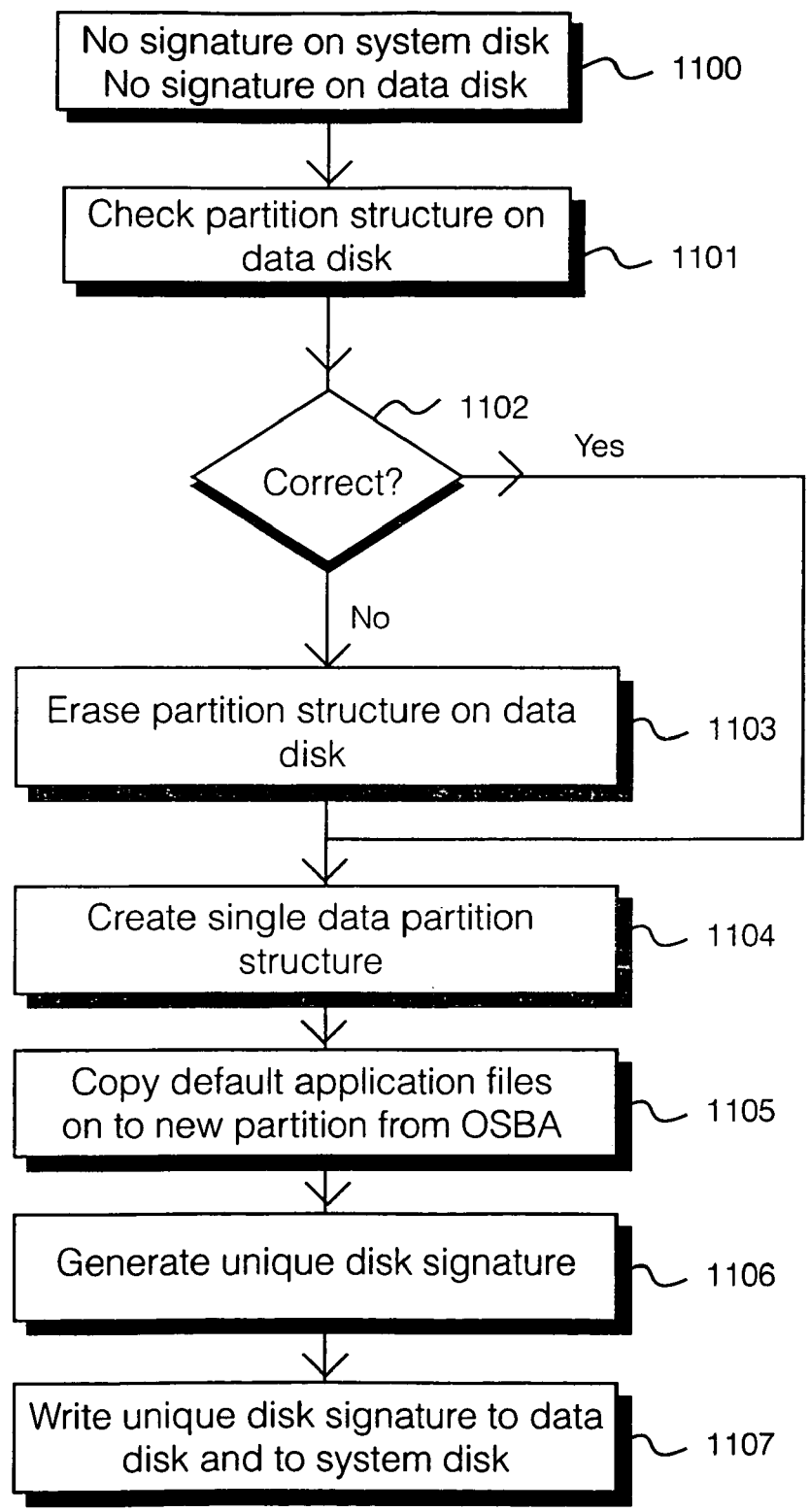
FIG. 11 illustrates schematically a process carried out by the computer entity where a system disk is detected having no signature, and a data disk in detected having no signature.

Referring to FIG. 11 herein, there is illustrated schematically a process carried out by the computer entity where a signature on a data disk is detected, but a system disk is detected which does not have a signature. Where this occurs, then this indicates that both the system and data disks are newly installed disks. In this case, each newly installed disk is already formatted with a partition structure as illustrated in FIG. 5 herein, and one of those newly installed disks is to be designated as a system disk, and the other newly installed disk is to be partitioned as a data disk as illustrated in FIG. 6. One of the disks is designated as a data disk and in step 1101, the partition structure on the data disk is examined, to determine whether the partition structure matches an expected partition structure of a single large partition across an entire disk. If in step 1102 the partition structure of the designated data disk is found to be incorrect, then in step 1103 the partition structure is erased, which involves erasing all content on the disk, including any operating systems within a master system disk template which pre-exists on the disk. A single data partition structure as illustrated in FIG. 6 is created in step 1104. In step 1105, any default application files which are expected on the data disk, for example data base files, are copied into the newly created partition from the operating system back up area 511. In step 1106, a unique disk signature is generated. In step 1107, the unique disk signature is written to both the data disk and to the system disk, so that the data disk and the system disk are labeled with signatures which identify the system disk and data disk as belonging to a coherent matched set.

Referring to FIG. 12 herein, there is illustrated schematically a state diagram for setting of flags within the computer entity. Three main flags are present, being a "system reset; restore user settings" flag 1200, a "system reset: manual initiation" flag 1201 and a "system reset: data deleted" flag 1202. Where the "system reset: restore user settings" flag is set but the other two flags are not set, then a corresponding alert message may be generated that the operating system was automatically repaired after an operating system failure, but without any loss of back-up data. Where the "system reset: restore user settings" flag 1200 and the "system reset: manual initiation" flag 1201 are set, then the corresponding alert message is that a system repair or update was manually initiated, but without any loss of back-up data. Where the "system reset: restore user settings" flag and the "system reset: data deleted" flag are set but the remaining flag is un-set, then a corresponding alert message is that the system automatically repaired after a data disk replacement but back-up data could not be recovered and so was deleted. In other words, automatic repair resulted in a reset with data delete. Where all three flags are set, then the corresponding alert message is that the system was repaired by a manually initiated update, but the back-up data has been deleted.

Figure 13:
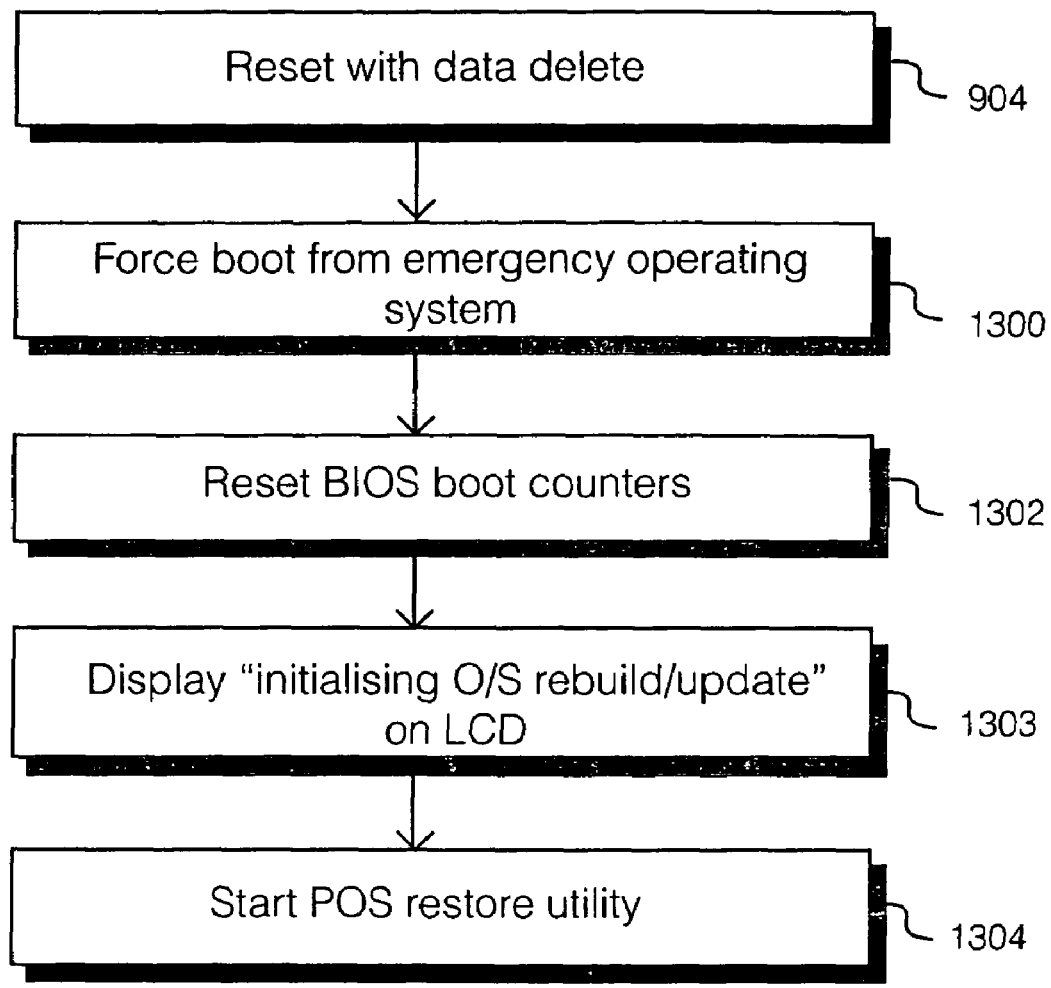
FIG. 13 illustrates schematically a reset with data delete process carried out by the computer entity.
Figure 14A:
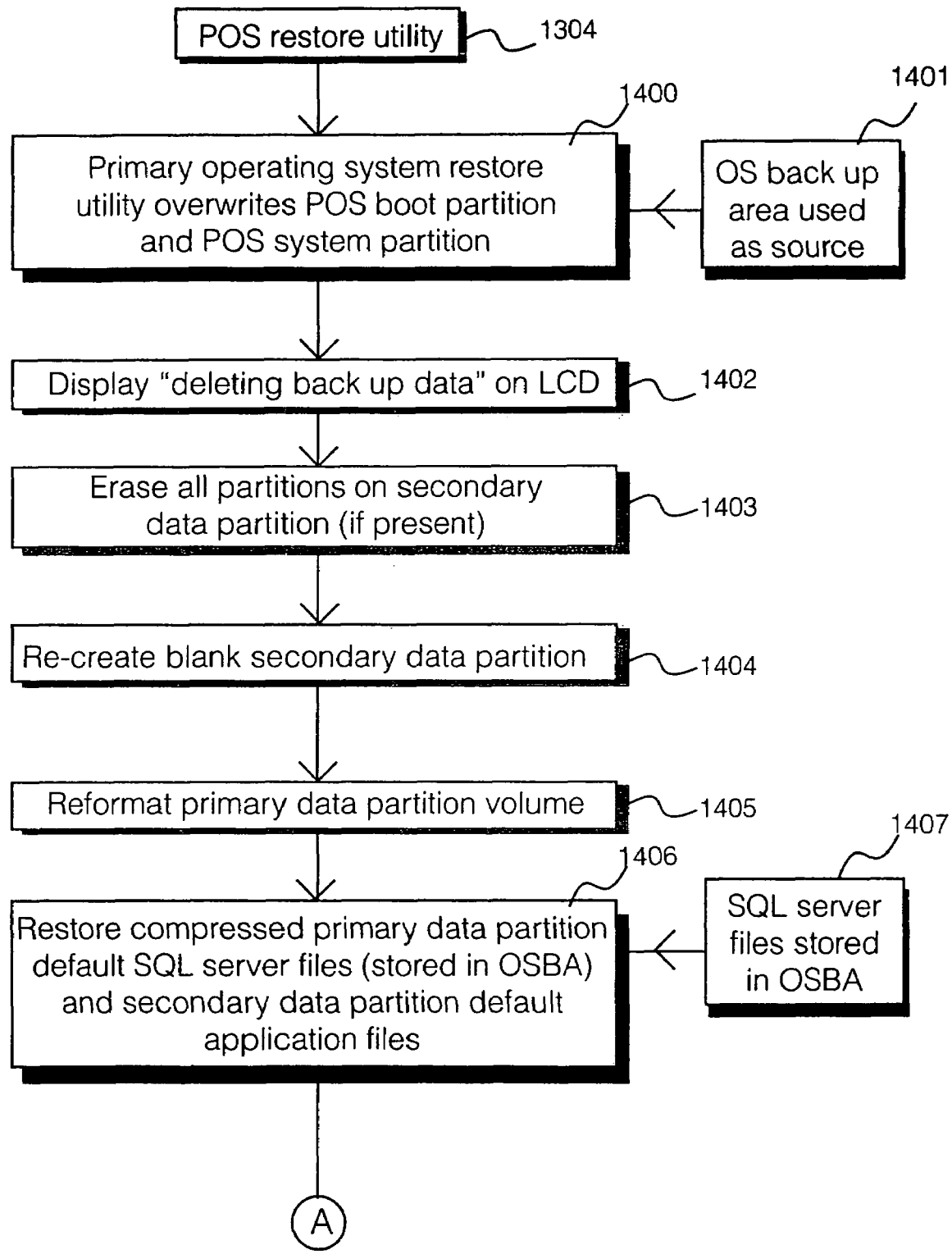
FIGS. 14A-14D illustrate schematically operations carried out by a primary operating system restore utility during a set process for resetting the computer entity with deletion of data.
Figure 14B:
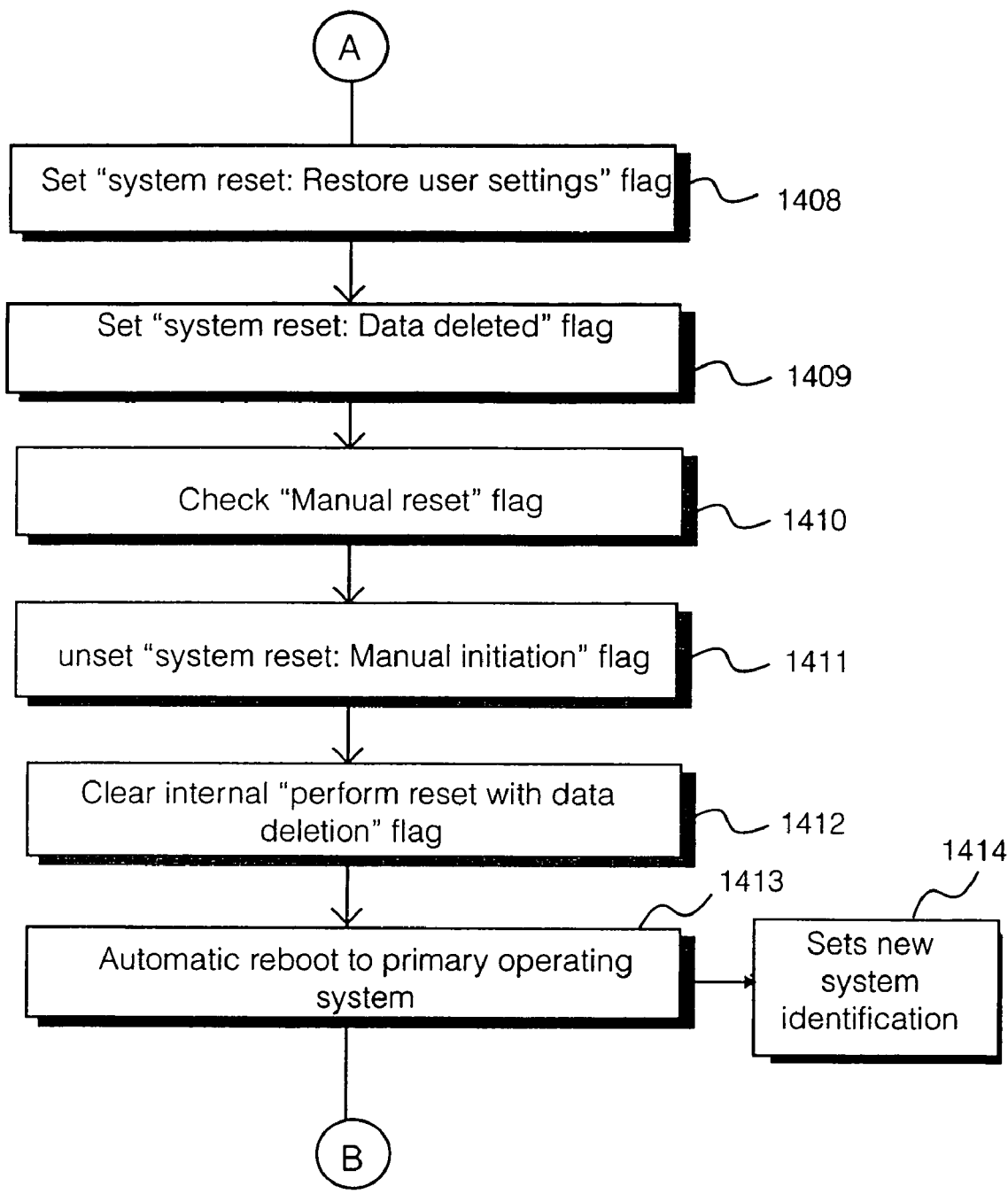
Figure 14C:
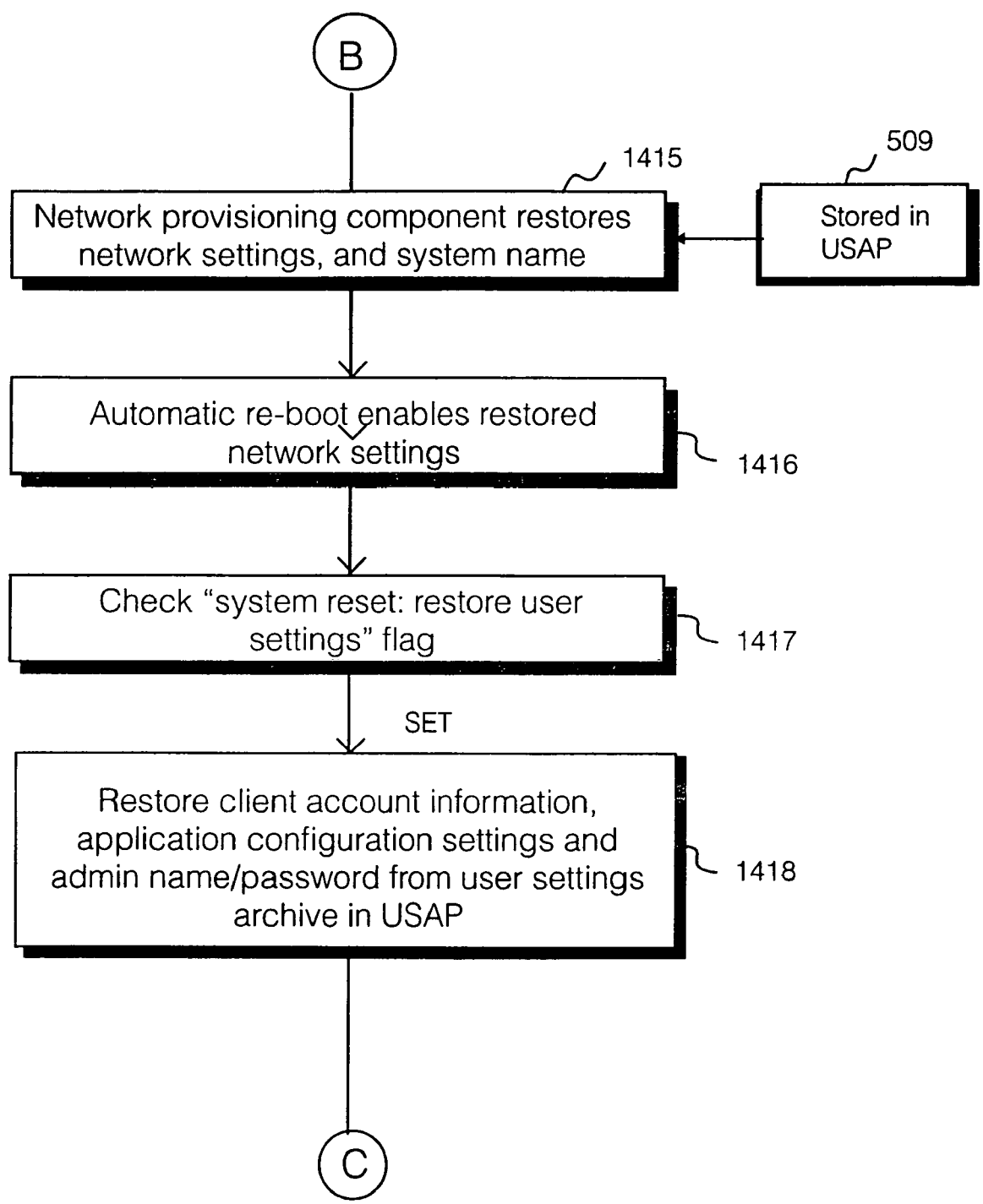
Figure 14D:
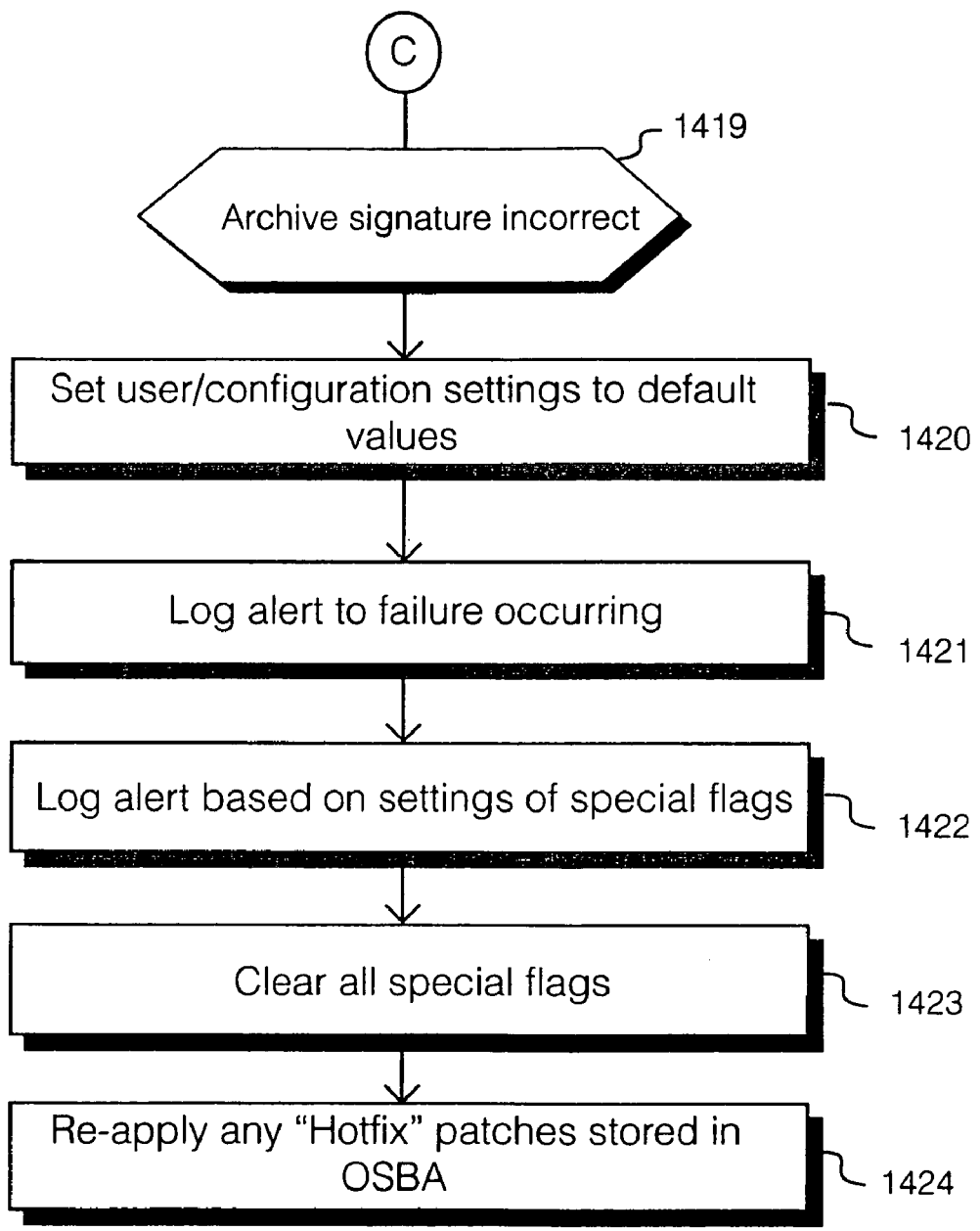

Referring to FIG. 13 herein, there is illustrated schematically a reset with data delete process carried out by the computer entity, following replacement of a data disk in the computer entity. The reset with data delete automatically resets the application data on both the system and data disks back to a factory default state. In step 1300, a boot is forced from the emergency operating system 401. The emergency operating system successfully automatically resets the BIOS boot counters in step 1302. In step 1303 whereby the administration interface 701, and optionally the LCD 103 displays an "initializing operating system rebuild/update" display. In step 1304, the primary operating system restore utility 703 is started.

Referring to FIGS. 14A-D herein, there is illustrated schematically operation of the computer entity under control of the primary operating system restore utility 603, for performing a reset of the computer entity with data delete. In step 1400, the primary operating system restore utility 703 overwrites the primary operating system boot partition 504 and the primary operating system system partition 501 using the pristine copy of the primary operating system files 512 stored in the operating system back-up area 511 in step 1401. In step 1402, there is displayed on the LCD 103 the message "deleting application data". In step 1403, the primary operating system utility 603 erases all partitions on the secondary data partition of the data disk (if present) and re-creates a blank secondary data partition 601 in step 1404. In step 1405, the primary data partition 506 on the system disk is reformatted and in step 1406 compressed primary data partition default SQL server files, which are stored in the operating system back-up area 511 are restored and default application files are restored to the secondary data partition from the operating system back-up area. In step 1408, if the "system reset: restore user settings" flag is set, and the "system reset: data deleted" flag 1202 is set, then in step 1410 it is checked whether a "manual reset" flag is set. A "system reset: Manual initiation" flag is checked to be in an unset condition, and is unset if found to be "set". In step 1412 an internal "Perform reset with data deletion" flag, which was used to initiate the data deletion, during reset is cleared. In step 1413, there is performed an automatic reboot of the primary operating system, which sets a new system identification in step 1414. In step 1415, the network provisioning component 604 restores the network settings and system name, which are stored in the user settings archive partition 509. In step 1416, use of a new boot file to boot the SQL database, that is a new "SQLBOOT.DLL" file, avoids problems due to change of the system name. In step 1417, the "system reset: restore user settings" flag is checked and if set, then in step 1418 client account information is restored along with application configuration settings and administration names and passwords, from the user settings archive partition 509. In step 1419, it is checked whether an archive signature is incorrect, and in step 1420 if the archive signature is incorrect, there are set user/configuration settings to default values. In step 1421, an alert message is generated alerting that the archive signature was found to be incorrect. In step 1422, an alert is logged based on the settings of the flags illustrated in FIG. 12 herein. In step 1423, all the special flags illustrated in FIG. 12 herein are cleared and in step 1424, any "hot fix" upgrade patches to the operating system stored in the operating system back-up area 511 are reapplied to the primary operating system system partition 501.

The invention claimed is:

1. A computer-readable medium or storage device comprising:
   at least one sequence of instructions, wherein execution of the instructions by a computer entity having a first data storage device and a second data storage device causes the computer entity to:
   set digital signatures of the first and second data storage devices to be in a self consistent set if there are digital signatures found in the first and second storage devices and there is a discrepancy in the digital signatures found in the first and second data storage devices; and
   re-set the computer entity to a known state,
   wherein if:
      the first data storage device includes an operating system, and a digital signature is found on the first data storage device; and
      no digital signature is found on the second data storage device;
   then the instructions causing the computer entity to re-set the computer entity to a known state cause the computer entity to:
      re-build a primary operating system on the first data storage device; and
      delete data from the second data storage device.

2. The computer-readable medium or storage device of claim 1, wherein:
   the first data storage device comprises a system data storage device storing operating system data;
   the second data storage device is assigned for storage of application data; and
   the instructions causing the computer entity to re-set the computer entity to a known state cause the computer entity to:
      delete data on the second data storage device; and
      apply a new digital signature to the first data storage device and the second data storage device, so the first and second data storage devices are marked with digital signatures in a matching set.

3. The computer-readable medium or storage device of claim 2, further comprising instructions which cause the computer entity to:
   generate a unique digital disk signature; and
   write the unique digital disk signature to the first data storage device and the second data storage device.

4. The computer-readable medium or storage device of claim 1, wherein if:
   the first data storage device includes a digital signature;
   the second data storage device includes a digital signature; and
   the digital signature of the first data storage device does not match the digital signature of the second data storage device,
   then the instructions causing the computer entity to re-set the computer entity to a known state comprise instructions which cause the computer entity to:
      re-set the computer entity with deletion of application data generated as a result of at least one application program.

5. The computer-readable medium or storage device of claim 4, wherein the instructions causing the computer entity to delete a previous set of primary operating system files comprise instructions which cause the computer entity to overwrite the primary operation system partition.

6. The computer-readable medium or storage device of claim 4, wherein the instructions causing the computer entity to re-set the computer entity with deletion of application data comprise instructions which cause the computer entity, under control of a secondary emergency operating system, to:
   delete a previous set of primary operating system files from a primary operating system partition of the first data storage device;
   erase a secondary data partition on the second data storage device;
   erase a primary data partition on the first data storage device;
   recreate a set of data partitions to a first known partition configuration on the first data storage device;
   recreate a set of data partitions to a second known partition configuration on the second data storage device;
   restore application configuration settings from stored application configuration settings in a user system archive partition of the first data storage device.

7. The computer-readable medium or storage device of claim 6, wherein:
   if the stored application configuration settings in the user system archive partition are corrupt, then the instructions causing the computer entity to re-set the computer entity cause the computer entity to:
      set a set of user configuration settings to default values.

8. The computer-readable medium or storage device of claim 7, further comprising instructions which cause the computer entity to:
   restore default application data from a partition area of the first data storage device onto the formatted known partition structure of the second data storage device.

9. The computer-readable medium or storage device of claim 1, wherein the instructions causing the computer entity to re-set the computer entity to a known state cause the computer entity to:
   erase the second data storage device and format the second data storage device into a known partition structure if the partition structure does not match the expected partition structure.

10. The computer-readable medium or storage device of claim 9, wherein the known partition structure comprises a single partition.

11. A computer entity comprising:
   a processor;
   a first data storage device adapted to be coupled to the processor, the first data storage device being arranged for storing a digital signature and at least one sequence of instructions for execution by the processor;
   a second data storage device adapted to be coupled to the processor, the second data storage device being arranged for storing a digital signature,
   wherein execution of the sequence of instructions stored on the first data storage device by the processor, causes the processor to:
      set digital signatures of the first and second data storage devices to be in a self consistent set if a discrepancy in digital signatures is found between the first and second data storage devices; and re-set the computer entity to a known state, wherein if;

the first data storage device includes an operating system, and a digital signature is found on the first data storage device; and no digital signature is found on the second data storage device;

then the instructions causing the computer entity to re-set the computer entity to a known state cause the computer entity to:

re-build a primary operating system on the first data storage device; and delete data from the second data storage device.

12. A computer entity comprising:

a processor;

a plurality of data storage devices adapted to be coupled to the processor, each of the plurality of data storage devices being arranged for storing a digital signature, wherein a first data storage device of the plurality of data storage devices has stored therein at least one operating system, and an installation component for installing the first data storage device into the computer entity, the installation component comprising at least one sequence of instructions for execution by the processor, wherein execution of the sequence of instructions stored on the first data storage device by the processor, causes the processor to:

(i) determine which data storage devices are already designated as system data storage devices containing an operating system and which data storage devices are already designated as for storing bulk data if all the digital signatures of the plurality of data storage devices are not in a matching set;

(ii) depending on the result of step (i), designate the first data storage device as a system data storage device or a bulk data data storage device, so that among the plurality of data storage devices there exists at least one system data storage device and at least one bulk data data storage device; and (iii) re-set the computer entity to a known state, wherein if in step (ii), the first data storage device is designated as a system data storage device, execution of the sequence of instructions causes the processor to:

delete all files present in a secondary data partition of a bulk data data storage device;

create new digital signatures on the system data storage device, and wherein if in step (ii), the first data storage device is designated as a bulk data data storage device, then execution of the sequence of instructions causes the processor to:

rebuild a primary operating system on a system data storage device; and return application data on the system data storage device and the bulk data data storage device to a known default state.

* * * * *